United States Patent Office 3,606,194
Patented Sept. 20, 1971

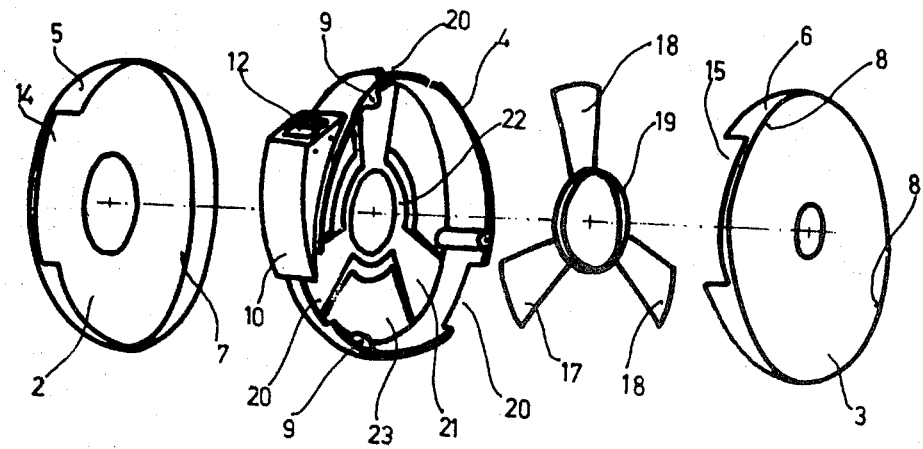
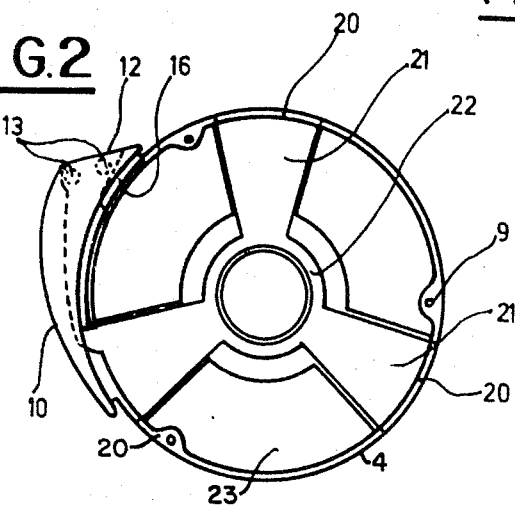
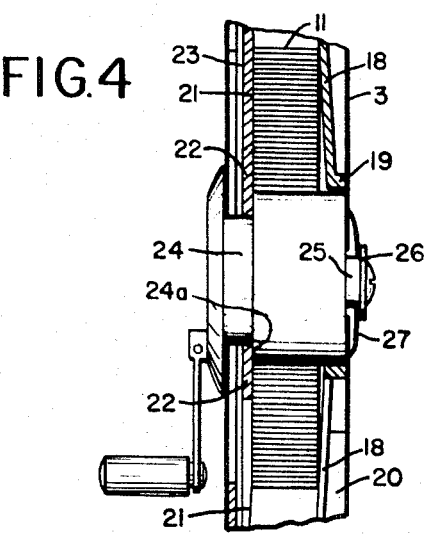
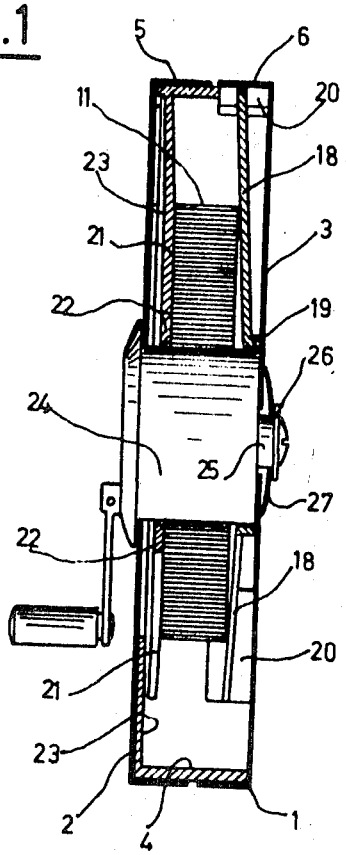

3,606,194
CASING FOR TAPE MEASURE
Andre Quenot, Besancon, France, assignor to
Quenot & Cie S.a.r.l., Besancon, France
Filed Mar. 5, 1969, Ser. No. 804,716
Claims priority, application France, Apr. 22, 1969,
148,905
Int. Cl. B65h 75/16
U.S. Cl. 242—84.8                 9 Claims

ABSTRACT OF THE DISCLOSURE

A tape measure casing having a mandrel positioned therein for supporting a coiled measuring tape. The mandrel has radial fingers for cooperation with a spring having corresponding radial fingers for guiding the winding of the tape and for acting as a brake on the coiled tape. The mandrel is provided with slots in its peripheral face for receiving the outer extremities of the spring fingers to prevent rotation of the spring, but to allow axial movement of the spring fingers as they bear on the tape. Other braking means can be held in place by the mandrel or secured thereon, and the mandrel can also carry an outlet allowing the tape to be tangentially withdrawn from the casing.

---

This invention is concerned with an instrument casing for linear measuring instruments using a graduated tape.

There already exists a certain number of linear measuring instruments employing a tape whose circular casing allows the tangential withdrawal of the tape. In these designs, the casing has on its peripheray an appendage, allowing such tangential withdrawal. This appendage which can be provided with guiding rollers, is either mounted on the casing or integrally made with the casing, or made by moulding it with a peripheral mandrel external to the casing and surrounding the same.

It is known also that the use of a metallic tape in such casings raises problems due to the elasticity of the wound tape which, seeking to return to its natural position, causes the crank of the winding drum to turn in a dangerous and unwanted manner, and causes translational movement in the part of the tape which lies outside the casing.

The applicant has already designed, and protected by patents, braking devices which act on the winding drum, and others which act on the wound tape itself. These devices, in particular those acting directly on the tape, must not be rotatable relative to the casing. It is thus necessary to equip the casing with members which prevents this rotation, which already complicates the making of casings moulded from synthetic material. This necessity is evidently even more bothersome in the case of casings constituted by two metallic walls connected together by means of outer peripheral mandrels or rings.

Consequently this invention has for its purpose a casing for a linear measuring instrument employing a tape such as one of a ten meters length, of simple design, of aesthetic appearance, allowing for efficient braking of the metallic tape as well as for facile withdrawal of said tape outside the casing.

To this effect the invention is concerned with a casing for a linear measuring instrument using a tape such as one having a ten meter length, characterized by a peripheral mandrel having on the one hand means for fastening the two case members of the casing, and on the other hand a device allowing withdrawal of the tape outside the casing, the said peripheral mandrel having parts positioned inside the casing formed by the two case members for maintaining or for braking the tape.

The invention will be better understood by referring to the following description, made by way of non limiting example, as well as to the accompanying drawings in which:

FIG. 1 shows an exploded view of the casing with the braking device.

FIG. 2 shows an elevational view of the peripheral mandrel.

FIG. 3 shows an axial cross section of the complete instrument.

FIG. 4 shows a partial view of a modification of the embodiment illustrated in FIG. 3.

The linear measuring instrument, for example a decameter, comprises a casing 1 composed of two metallic case members 2 and 3 which are united by means of a circular peripheral mandrel 4 preferably made of moulded synthetic material. The lateral walls 5 and 6 of case members 2 and 3 entirely cover the said mandrel 4, the case members 2 and 3 being secured on the mandrel 4 by screws (not shown) which pass through them in openings 7 and 8 to screw in tap holes 9 of mandrel 4. Other fastening means can be used.

The peripheral mandrel 4 can be preferably provided with appendage 10 allowing tangential withdrawal of tape 11. The hollow appendage 10 guides the tape up to an opening 12 having for example two rollers 13. The case members 2 and 3 are equipped on their lateral sides 5 and 6 with slits 14 and 15 corresponding to appendage 10 which can itself be provided at its connection with the mandrel 4 with a groove 16 in which engage the edges of slits 14 and 15, and this for an aesthetic purpose.

Tape 11 is braked, in particular on the outer coils of its winding by a spring 17 having several branches 18, for example three. Spring 17 bears by its central part 19 against case member 3; branches 18 seeking under the action of their own elasticity to go near the opposite case member 2. In order to prevent all rotation of spring 17, the ends of branches 18 thereof penetrate in the slits 20 of the inner mandrel 4. The depth of these slits 20 allows the separation of the branches 18 but not their rotation.

Mandrel 4 additionally can be provided with three fingers 21 positioned in front of fingers 18 of spring 17 and connected at their extremities by a ring 22. These inner extremities fingers 21 are disposed axially inward of the casing, said fingers being resilient to exert a spring force against the tape. Side walls 23, which are integral with said mandrel 4 and extend inwardly therefrom, are positioned between fingers 21 parallel with case member 2 for providing a greater stiffness to mandrel 4.

Fingers 21 which can have a certain elasticity, serve to guide the coils of tape 11 in such a way as to urge the innermost coils of the tape toward case member 3, and consequently toward fingers 18 of spring 17.

As a result fingers 18 which always bear against the outermost coil of winding 11 only slightly become deformed according to the different status of the unwinding of the tape. There is thus obtained a substantially constant braking force while limiting the maximum bending of fingers 18.

It goes without saying according to the invention that other braking devices held by mandrel 4 or integral therewith can be provided. Thus by way of a simple example, radial fingers similar to fingers 21 can be secured on mandrel 4 on either side of the tape.

The braking action of the tape can be improved by a braking device acting on the drum 24 itself. Thus this drum 24 can comprise an axial post 25 screwed in the said drum and holding by means of its rim 26 a cupola shaped spring 27 which by bearing against case member 3 urges drum 24 towards the case member against which it rubs.

The braking of the drum can also be occasioned by one or several braking devices positioned inside casing 1 and held by mandrel 4 or secured thereon. Thus for example, ring 22 could act against a rinm 24a of drum 24, as shown in FIG. 4, to bring this latter in frictional contact with case member 3. In a modification, the braking of the drum can be effected by the central part 19 of spring 17 pushing back through a suitable rim to cause the drum 24 to press against case member 2. For this purpose the central part 19 can be provided with elastic fingers extending on the other side of fingers 18 with respect to the plane of the central part 19 and bearing against case member 3.

What is claimed is:

1. A tape measuring device including a coiled flexible tape and a winding drum about which the tape is to be coiled, a mandrel with fastening means, a pair of case members held by the fastening means on said mandrel, each of said members having a corresponding part forming a peripheral opening to permit ingress and egress of said tape, and braking means carried by said mandrel and adapted to act on said tape, comprising the improvement wherein said braking means includes a spring defined by a central portion having a plurality of elastic fingers extending radially therefrom, said mandrel having guiding means for receiving the extremities of said fingers and in which said fingers are axially movable and rotationally fixed.

2. The invention as set forth in claim 1 wherein said winding drum has a rim and said central portion of said spring bears against said rim, and wherein said spring further comprises a second plurality of elastic fingers supported on one of said case members.

3. A tape measuring device including a coiled flexible tape and a winding drum about which the tape is to be coiled, a mandrel with fastening means, a pair of case members held by the fastening means on said mandrel, each of said members having a corresponding part forming a peripheral opening to permit ingress and egress of said tape and braking means carried by said mandrel and adapted to act on said tape, comprising the improvement wherein said mandrel has at least one inwardly inclined finger made integral therewith for bearing against the coiled tape.

4. A device according to claim 1, wherein said mandrel has a peripheral portion, a central ring and a plurality of radially extending springable fingers joining said ring to said peripheral portion.

5. A device according to claim 4, wherein said winding drum has a rim and said mandrel ring bears against said rim to urge said drum against one of said case members.

6. A tape measuring device including a coiled flexible tape and a winding drum about which the tape is to be coiled, a mandrel with fastening means, a pair of case members held by the fastening means on said mandrel, each of said members having a corresponding part forming a peripheral opening to permit ingress and egress of said tape, and braking means carried by said mandrel and adapted to act on said tape, comprising the improvement wherein a hollow appendage is secured to said mandrel adjacent said peripheral opening for guiding said tape tangentially towards the opening.

7. A device according to claim 6, further comprising a pair of rollers connected in a parallel relation within said hollow appendage and between which passes said tape.

8. A device according to claim 6, wherein said appendage is surrounded with a groove which receives the edge of said case members at said corresponding parts of said case members which define said peripheral opening.

9. A tape measuring device including a coiled flexible tape and a winding drum about which the tape is to be coiled, a mandrel with fastening means, a pair of case members held by the fastening means on said mandrel, each of said members having a corresponding part forming a peripheral opening to permit ingress and egress of said tape, and braking means carried by said winding drum, comprising the improvement wherein said braking means includes a flange on one side of said winding drum and disposed in engagement with an external face of one of said case members, a post extending from the other side of said winding drum, a retaining flange fixed to said post and spaced from said drum, and a cupola shaped spring disposed between said retaining flange and an external face of the other of said face members, whereby said flange on said drum is urged against said one of said case members under the force of said spring.

References Cited

UNITED STATES PATENTS

| 1,939,546 | 12/1933 | Farrand | 242—84.8 |
| 1,992,947 | 3/1935 | Hayward | 33—138 |
| 2,014,375 | 9/1935 | Carlson | 33—138 |
| 2,110,210 | 3/1938 | Evans | 242—84.8 |
| 2,893,656 | 7/1959 | Carlson | 242—84.8 |
| 3,114,515 | 12/1963 | Kane | 242—107.3 |

STANLEY N. GILREATH, Primary Examiner

W. H. SCHROEDER, Assistant Examiner